United States Patent [19]

Rajagopalan et al.

[11] Patent Number: 5,037,929
[45] Date of Patent: Aug. 6, 1991

[54] PROCESS FOR THE PREPARATION OF GRANULAR COLD WATER-SOLUBLE STARCH

[75] Inventors: Shyamala Rajagopalan; Paul A. Seib, both of Manhattan, Kans.

[73] Assignee: Kansas State University Research Found., Manhattan, Kans.

[21] Appl. No.: 571,085

[22] Filed: Aug. 22, 1990

[51] Int. Cl.$^5$ .......................................... A23L 1/0522
[52] U.S. Cl. .................................. 426/578; 426/579; 426/658; 426/660
[58] Field of Search ............... 426/578, 579, 661, 658; 127/32, 33

[56] References Cited

U.S. PATENT DOCUMENTS

| | | | |
|---|---|---|---|
| 3,949,104 | 4/1976 | Cheng et al. | 426/578 |
| 4,104,212 | 8/1978 | Bruner | 426/578 |
| 4,291,066 | 9/1981 | Anema et al. | 426/578 |
| 4,465,702 | 8/1984 | Eastman et al. | 426/578 |
| 4,623,549 | 11/1986 | Katt et al. | 426/579 |
| 4,634,596 | 1/1987 | Eastman | 426/578 |

OTHER PUBLICATIONS

Journal of Polymer Science-Vol. XXVIII, pp. 1-9 (1958), Separation of Amylose from Amylopectin of Starch by an Extraction-Sedimentation Procedure, Edna M. Montgomery and F. R. Senti.

Primary Examiner—Jeanette Hunter
Attorney, Agent, or Firm—Hovey, Williams, Timmons & Collins

[57] ABSTRACT

An improved, atmospheric pressure process for the production of granular cold water-soluble starches is disclosed which comprises forming a slurry of starch granules, water and polyhydric alcohol (e.g. 1,2-propanediol), heating the slurry to convert the starch crystalline structure to a V-type single helix crystalline arrangement or to an amorphous structure, and thereafter separating the converted, cold water-soluble starch granules from the liquid phase. The process can be used to good effect on cereal, tuber, root and legume starches and on many of their cross-linked and substituted forms to yield cold water-soluble starch granules having cold water-solubilities on the order of 70-95%.

12 Claims, No Drawings

PROCESS FOR THE PREPARATION OF GRANULAR COLD WATER-SOLUBLE STARCH

BACKGROUND OF THE INVENTION

1. Field of the Invention

The present invention is broadly concerned with an improved process for the preparation of granular cold water-soluble starches (GCWS) which involves heating of a starch slurry comprising water, polyhydric alcohol and starch granules for converting the native partially crystalline starch to cold water-soluble granules with V or amorphous-type x-ray patterns. More particularly, it is concerned with such process which may be carried out at atmospheric pressure and with moderate amounts of polyhydric alcohol solvent to yield finished cold water-soluble starches. Pastes made from GCWS starches in cold to warm water systems are comparable to those of cook-up starches in smoothness of texture, sheen, cold-storage stability, and gelling properties.

2. Description of the Prior Art

Pre-gelatinized or instant starches are used in the preparation of many commercial food products. These instant starches are designed to swell and paste at low to warm temperatures. In the conventional processes for making instant starches, a starch slurry is simultaneously cooked and dried on a drum dryer to give a thin sheet, which is subsequently ground to a fine powder. Such drum-cooked instant starches often give inferior performance in foods as compared with cook-up starches. This is believed to result from the fact that on the hot drum, the cooked granules fuse together and are strongly cemented to form a starch sheet. Fine grinding of the sheet gives irregularly shaped particles that contain retrograded starch, leading to a grainy appearance upon rehydration. Furthermore, drum-cooked instant starches have reduced consistency upon rehydration to a paste and form gels of reduced strength.

In recent years methods have been developed to give pre-gelatinized starches with granular integrity. Some granular cold water-soluble starches hydrate without lumping in cold to warm solutions of sugar or other strongly hydrating food components, and their pastes are on a par with typical cook-up starches. Others hydrate in cold water without lumping, but have reduced capacity to generate thickening power.

U.S. Pat. No. 4,280,851 describes a process using a spray-drying chamber and a specialized nozzle. The nozzle atomizes a mixture of water and starch in a small chamber inside the nozzle, while steam is injected into the small chamber through a second opening. The moistened starch-steam mixture is retained in the chamber long enough to effect gelatinization of the starch granules, after which time the rapidly moving granules exit the chamber through a vent aperture and fall into a fluid-bed drying chamber.

U.S. Pat. No. 4,465,702 describes a method for the production of granular cold water-soluble corn starch wherein a slurry comprising of corn starch, water and a monohydric alcohol are heated under elevated pressures of from about 400–600 psig. This process is deemed deficient in that it requires a high pressure vessel. Moreover, normal corn starch and octenylsuccinylated corn starch were the only starches converted to the new physical form.

E. M. Montgomery and F. R. Senti in *J. Polymer Sci.* 28(1958)1 described a treatment of corn, wheat and potato starches with 70–85% aqueous organic solvents at 89° C. The solvents included glycerol, cellosolve, n-butanol, dioxane and pentasol. After removal of the aqueous organic solvent mixture by solvent exchange and drying, pre-treated starches gave improved leaching of amylose when heated in water. The authors preferred pretreatment with hot 85% aqueous organic solvents, gave no loss of birefringence of the starch granules. The authors did report loss of birefringence in hot 70% aqueous glycerol.

SUMMARY OF THE INVENTION

The present invention is concerned with a process for preparing granular cold water-soluble starches wherein intact starch granules are contacted with a liquid phase comprising water and a polyhydric alcohol, whereupon the resulting starch slurry is heated to effect conversion of the starch's original A-, B- or C-crystalline structure to a weak V-type single helix crystalline structure or an amorphous structure, while substantially maintaining the granular integrity of the starch. At this point the converted cold water-soluble starch granules are separated from the liquid phase. This is generally done by solvent-exchange using ethanol, which most often converts the normal starches into the V-type structure.

In particularly preferred forms, the process of the invention may be carried out at substantially atmospheric pressure, thereby eliminating a principal problem associated with prior processes.

The process of the invention may be used for the conversion of a wide variety of starches, such as those selected from the group consisting of cereal, tuber, root and legume starches. Particular examples include starches selected from the group consisting of native wheat, corn, potato, sweet potato, tapioca, and mung bean, as well as cross-linked and substituted wheat, corn, waxy corn, tapioca and potato.

The polyhydric alcohol used in the invention is advantageously selected from the group consisting of ethylene glycol, glycerol, 1,2- or 1,3-propanediol, and the four positional isomers of butanediol. For food-grade starches, 1,2-propanediol, 1,3-butanediol and glycerol are preferred. Aqueous monohydric alcohol mixtures do not perform properly. Either the boiling point of an aqueous monohydric alcohol mixture is too low at atmospheric pressure, or two liquid phases are present.

The starting starch slurry of the invention should have starch:water weight ratio of from about 1:0.6 to 1:3, more preferably from about 1:1 to 1:3, and a starch:polyhydric alcohol weight ratio of from about 1:2 to 1:10, and more preferably from about 1:2 to 1:7, both of such ratios being on a dry starch basis, dsb.

After the starch/water/polyhydric alcohol slurry is formed, it is heated under time and temperature conditions for converting the crystalline structure of the starch granules to cold water-soluble amorphous or weakly crystalline V-type starch, while substantially maintaining the granular integrity of the starch. Typically, this would involve heating to a temperature from about 80°–130° C., more preferably from about 85°–127° C. for a period from about 3–30 minutes, and more preferably from about 10–15 minutes.

After the starch granules have been converted, they are separated from the liquid phase of the starting slurry. Such separation is preferably effected by adding an excess of volatile solvent to the slurry, which is miscible with water and polyhydric alcohol, and at the end of the process volatilizing the solvent. The displacement of liquid from the GCWS starch by the volatile solvent is especially rapid since granular integrity has been substantially maintained and diffusion distances are short. The volatile solvent may be selected from the group consisting of edible alcohols, for example, ethanol, methanol, and isopropanol. In actual practice, after the heating step is completed, the mixture is allowed to cool to about 100° C., at which time ethanol is added. After further cooling to about 45°-50° C., the reaction mixture is suction-filtered, washed and treated with ethanol, and dried.

The cold water-soluble starches produced by the present invention are usually intact granules, but in some few cases, they are fragments of granules. The concentric layers in some starches are held together weakly, and heating those starches in aqueous polyol mixtures, followed by dehydration causes release of shell-shaped fragments.

The granular, or fragmented granular, cold water-soluble starch has a cold water-solubility of at least about 70%, and more preferably at least about 90%. The product may be readily rehydrated in cold to warm aqueous systems and exhibits excellent paste characteristics.

DESCRIPTION OF THE PREFERRED EMBODIMENTS

EXAMPLES

The following examples illustrate the most preferred methods for preparing granular cold water-soluble (GCWS) starches in accordance with the method and final products of the invention.

I. Aqueous Propanediol Process

A. Preparation of GCWS Wheat Starch

In general, GCWS starches were prepared starting with either 10 g or 50 g of starch.

Into a 3-necked 2 L flask provided with a mechanical stirrer, thermometer and reflux condenser was added a liquid mixture containing water (62.9 g) and 1,2-propanediol (203.2 g). To this mixture was added with stirring 50 g of wheat starch (45.2 g, dry starch basis, dsb). The flask containing the above slurry was placed in a pre-heated oil bath (bath temperature 145°-155° C.) for 15 minutes with stirring. As the product temperature reached 116° C. at the end of the heating period, most of the liquid had been absorbed by the starch. A small sample of the reaction mixture, which appeared opaque, was removed and found to be non-mouldable at low pressure. The contents of the flask were allowed to cool to 100° C., at which time absolute or 95% ethanol (1 L) was added with gentle stirring. After further cooling to about 45°-50° C., the reaction mixture was suction-filtered and washed with ethanol (100 mL). At this time, the starch product appeared to be a fluffy, moist material that was not cohesive when compressed between the fingers.

The semi-moist mass was then slurried with excess absolute or 95% ethanol (3×250 mL) using a magnetic stir bar, then dried sequentially in a vacuum desiccator over calcium chloride (RT,24h) and in an oven (40°-45° C.,24h). The fine powdery starch (41.0 g,dsb) represented 91% product recovery, and the losses of solids were attributed to the transfer steps. Analysis of all the liquids used in the process showed no carbohydrate was lost in the liquids, which indicated 100% yield of starch, except for approximately 0.5% loss as lipid. The GCWS starch exhibited a cold water-solubility of 82% as determined by the method of *Jané et al., Starch/Starke* 38(1986)258. It gave a V-type x-ray pattern, and released stoichiometric levels of D-glucose when hydrolyzed by glucoamylase (AACC Approved Methods, Method No 7611). Scanning electron microscopy (SEM) showed the product consisted mostly of intact granules with a surface partially coated with fuzzy appearing material. Light microscopy (LM) with bottom-illumination using white light also showed intact granules. Furthermore, the granules appeared colored, except for a thin zone on the perimeter of the granules. The granules had an overall brownish hue but were studded with tiny zones of green and purple. The color was attributed to multiple fractures inside the granule which caused refraction of the light. Under LM with crossed Nicol prisms, the granules showed a diffuse birefringence but no Maltese cross.

B. Preparation of GCWS Tapioca Starch

Into a 3-necked 2 L flask provided with a mechanical stirrer, thermometer and a reflux condenser was added a liquid mixture containing water (59.5 g) and 1,2-propanediol (197.1 g). To this mixture was added with stirring 50 g of tapioca starch (43.8 g,dsb). The flask containing the above slurry was placed in a pre-heated oil bath (bath temperature 145°-155° C.) for 15 minutes. The reaction mixture gradually lost fluidity as the product temperature reached 114° C. at the end of the heating period.

Product isolation was carried out as described in Example I-A for native wheat starch. The amount of starch isolated (41.5 g,dsb) revealed 95% product recovery. This product exhibited a cold water-solubility of 99%, a V-type x-ray pattern, and predominantly intact granular starch as shown by SEM and LM.

In a separate experiment 1,3-propanediol was substituted for 1,2-propanediol in the reaction mixture, and the results were virtually identical.

C. Preparation of GCWS Potato Starch

Into a 3-necked 250 mL flask provided with a magnetic stirrer, thermometer and a reflux condenser was added a liquid mixture containing water (24.5 g) and 1,2-propanediol (25.9 g). To this mixture was added with stirring 10 g of potato starch (8.63 g,dsb). The flask containing the above slurry was placed in a pre-heated oil bath (bath temperature 145°-155° C.) for 10 minutes. The reaction mixture lost fluidity within 2 minutes of heating, and the product temperature reached 104° C. at the end of the heating period. The contents of the flask were allowed to cool to about 100° C., at which time ethanol (200 mL) was added. After further cooling for ately 10 minutes to about 45°-50° C. the reaction mixture was suction filtered and washed with ethanol (50 mL). The product was a mixture of large jelled pieces and fine, wet powder. The mixture was then treated with ethanol (3×50 mL) and dried as described in Example I-A for native wheat starch. The amount of starch isolated (7.98 g,dsb) revealed 93% product recovery. This product exhibited a cold water-solubility of 94%, a V-type x-ray pattern, and the appearance of a mixture of broken shells (fragmented granules) and intact granules as shown by SEM and LM. LM of granules again showed internal "graininess" and multiple colors at different points.

D. Preparation of GCWS Modified (Hydroxypropylated and Cross-Linked) Wheat Starch Into a 3-necked 2 L flask provided with a mechanical stirrer, thermometer and a reflux condenser was added a liquid mixture containing water (62.7 g) and 1,2-propanediol (202.9 g). To this mixture was added with stirring 50 g of modified wheat starch (45.1 g,dsb). The flask containing the above slurry was placed in a pre-heated oil bath (bath temperature 145°–155° C.) for 15 minutes. The reaction mixture gradually thickened as the product temperature reached 109° C. at the end of the heating period.

Product isolation was carried out as described in Example I-A for native wheat starch. When the first portion of ethanol was added to the reaction mixture, the product was a mixture of a wet-powder phase and a gel. Continued solvent exchange with more fresh ethanol gave 93% product recovery (42.0 g,dsb). The product exhibited a cold water-solubility of 94%, an amorphous x-ray pattern and showed predominantly intact granular starch as determined by SEM and LM.

E. Summary of GCWS Starches Prepared in Aqueous Propanediol Process

The data in Table 1 demonstrates that the low pressure aqueous propanediol process is successful for the preparation of GCWS starches from native and modified starches.

TABLE 1

Solubilities of GCWS Starches Prepared in the Aqueous Propanediol Process

| Run | Propanediol | Starch[a] | Reaction Temperature °C. 5 min | 10 min | Cold Water-Solubility, % |
|---|---|---|---|---|---|
| NATIVE STARCHES | | | | | |
| 1 | 1,2 | Wheat | 105 | 113 | 87 |
| 2 | 1,2 | Corn | 107 | 111 | 73 (85[b]) |
| 3 | 1,2 | Waxy corn | 106 | 113 | persistent gel[c] |
| 4 | 1,2 | Potato | 108 | 115 | 2 (94[d,g]) |
| 5 | 1,2 | Tapioca | 100 | 111 | 92 |
| 6 | 1,2 | Rice | 108 | 114 | 72 |
| 7 | 1,2 | Mung bean | 115 | 118 | 29 (79[e]) |
| 8 | 1,3 | Wheat | 101 | 114 | 83 |
| 9 | 1,3 | Tapioca | 108 | 114 | 100 |
| 10 | 1,2 | Waxy barley | 101 | 115 | 90[g,i] |
| MODIFIED STARCHES | | | | | |
| 11 | 1,2 | Wheat HP | 98 | 110 | 94[g] |
| 12 | 1,2 | Tapioca HP | 104 | 108 | 91[g] |
| 13 | 1,2 | Waxy corn HP | 100 | 106 | 91[g] |
| 14 | 1,2 | Wheat OS | 108 | 114 | 93 |
| 15 | 1,2 | Corn OX | 105 | 113 | 74 |
| 16 | 1,2 | Corn P | 103 | 115 | 73 |
| 17 | 1,2 | Waxy Corn | 110 | 115 | 86[g,h,i] |

[a]All reactions were carried out by heating 10 g of starch in a mixture of water and propanediol (starch:water:PD = 1:1.5:4.5, w/w/w) at an external temperature of 145–155° C. for 10 minutes. Mixtures were cooled to 100° C., at which time ethanol (200 mL) was added and the product was isolated using low shear stirring as described in Example I-A, except the amounts of solvents were reduced by one-fifth.
[b]This mixture was heated to a reaction temperature of 127° C. (bath temp. 165–175° C.).
[c]A suspension of individual granules did not form upon gentle stirring with ethanol using a magnetic stir plate. In a separate experiment, heating this starch with a 1:1.2:4.5 (w/w/w) ratio of starch:water:propanediol gave a GCWS waxy corn starch with 79% CWS and 34% hard, dry chunks.
[d]This reaction was conducted using a 1:3:3 (w/w/w) ratio of starch:water:propanediol.
[e]This reaction was done using 1:2:4.5 (w/w/w) ratio of starch:water:propanediol.
[f]Commercially obtained starches. HP = hydroxypropylated and cross-linked; OS = Octenylsuccinylated; OX = oxidized starch for breading and batters; and P = phosphorylated and cross-linked.
[g]After reaction and initial addition of ethanol, the products from the HP starches, cross-linked waxy corn, waxy barley, and potato contained gelled material as observed visually. Further solvent exchange in ethanol followed by drying gave a fine powder admixed with some hard chunks estimated to be less than 20% by dry weight for all samples except waxy barley, which gave 45% hard chunks. Cold water-solubility was done using a sample selected free of hard particles.
[h]Cross-linked only.
[i]The GCWs product showed fragmented granules by SEM.

II. Aqueous Glycerol or Ethylene Glycol Process

The following examples demonstrate the use of hot aqueous glycerol to produce GCWS starches.

A. Preparation of GCWS Potato Starch

Into a 3-necked 250 ml flask provided with a magnetic stirrer, thermometer and a reflux condenser, was added glycerol (38.8 g) and water (11.56 g). To this mixture was added with stirring 10 g of potato starch (8.63 g, dsb). The flask containing the above slurry was placed in a pre-heated oil bath (bath temperature 145°–155° C. for 10 minutes. The reaction mixture lost fluidity within 5 minutes of heating. The product temperature reached 115° C. at the end of the heating period. The reaction mixture at this point appeared to be a highly plasticized mass and was easily spreadable as a thin film on a strip of glass. Further product isolation was carried out as described in Example I-C for potato starch. The amount of starch isolated (7.85 g, dsb) revealed 91% product recovery. The dry product exhibited a cold water-solubility of 81%, a V-type x-ray pattern and predominantly intact granules as shown by SEM and LM.

B. Preparation of GCWS Modified (Hydroxypropylated and Cross-Linked) Wheat Starch Using the sample size and reaction set up described in Example II-A, a 1:1.5:4.5 (w/w/w) mixture of modified wheat starch, water and glycerol was heated to an internal temperature of 88° C. in 10 min reaction time (bath temperature 110°–120 C). The fluidity of the reaction mixture was lost within 5 minutes of heating. When the total product was isolated in the normal fashion (Paragraph IA), the dried product was mostly a finely granulated material that contained some hard chunks. The GCWS modified wheat starch exhibited 83% cold water-solubility, an amorphous type x-ray pattern and contained damaged granules and some granular fragments as shown by SEM and LM.

C. Summary of GCWS Starches Prepared in Aqueous Glycerol or Ethylene Glycol

The new process of the present invention gave starches of 81–84% cold water-solubility when potato, modified wheat and modified waxy corn was heated in aqueous glycerol (Table 2). Native wheat and corn starches heated in aqueous glycerol gave 60–61% cold water-solubility. The products obtained by heating in aqueous glycerol all gave 60–80% (except potato, which gave 16%) of starch solids as gel phase upon first addition of ethanol. Continued solvent exchange with ethanol reduced the gel phase to less than 15% in the case of potato starch and modified waxy corn starch, but much of the gel persisted while dehydrating normal corn and wheat and modified wheat starches. In the case of ethylene glycol, the reaction conditions to minimize formation of gelled material were difficult to identify, as evidenced by reactions done on wheat, corn and potato. Only the data on potato is given in Table 2.

TABLE 2

Solubilities of GCWS Starches Produced in the Aqueous Glycerol Process

| Run | Starch | Reaction Temperature. °C. 5 min | 10 min | Cold Water-Solubility, % |
|---|---|---|---|---|
| NATIVE STARCHES | | | | |
| 1 | Wheat[a] | 100 | 110 | 61 |
| 2 | Corn[b] | 90 | 104 | 60 |
| 3 | Potato[a] | 105 | 115 | 81 (61[c]) |

TABLE 2-continued

Solubilities of GCWS Starches Produced in the Aqueous Glycerol Process

| Run | Starch | Reaction Temperature, °C. | | Cold Water-Solubility, % |
|-----|--------|---------|---------|---------|
| | | 5 min | 10 min | |
| MODIFIED STARCHES[d] | | | | |
| 4 | Wheat HP[e] | 80 | 88 | 83 |
| 5 | Waxy Corn[f] | 86 | 96 | 84 |

[a]All reactions were carried out by heating 10 g of starch in a mixture of water and glycerol (starch:water:GL = 1:1.5:4.5, w/w/w) at an external temperature of 145-155° C. for 10 minutes, cooling and then adding ethanol (200 mL). The product was isolated as described in Example II-A.
[b]Heating bath temperature 130-140° C.
[c]This product was obtained by heating potato starch in a mixture of water and ethylene glycol (starch:water:EG = 1:1.5:4.5, w/w/w) at an external temperature of 110-120° C. for 10 minutes. Product isolation was carried out as described in Example II-A.
[d]Reactions with modified starches were carried out by heating a mixture of starch in aqueous glycerol (starch:H₂O:GL = 1:1.5:4.5, w/w/w) at an external temperature of 110-120° C. for 10 minutes.
[e]Commercially obtained starch - HP = hydroxypropylated and crosslinked.
[f]Cross-linked only. The GCWs product showed fragmented granules by SEM.

D. Montgomery and F. R. Senti, *J. Polym. Sci.* 28(1958)1 reported loss of birefringence when corn, wheat and potato starches were heated in a large excess of aqueous glycerol. That experiment was repeated using potato starch, and the treated starch was isolated free of glycerol and water. It was found that the treated potato starch gave an amorphous x-ray pattern and only 41% solubility in cold water (Table 3). When the Montgomery and Senti conditions were used on wheat and corn starch, the products gave amorphous x-ray patterns and 29% and 59%, respectively, of cold water-solubility (Table 3). The Montgomery and Senti conditions fail to give cold water-solubility when 1,2- propanediol or 1,3-butanediol are substituted for glycerol (Table 3).

TABLE 3

Comparison of X-ray Patterns and Cold Water-Solubilities of Physically Modified Starches Prepared According to Montgomery and Senti and the New Process

| Run | Starch | PHA Used[a] | Starch/ Water/ PHA, w/w/w | Heating Time, min. | Final Product Temp, °C. | X-Ray Pattern | Cold Water-Solubility, % |
|-----|--------|------|-------------|---------|---------|---------|---------|
| 1 | Potato | GL | 1:5.7:13.3[b] | 60 | 89 | Amorphous[c] | 41 |
| 2 | Potato | GL | 1:1.5:4.5 | 10 | 115 | V | 81 |
| 3 | Corn | GL | 1:5.7:13.3 | 60 | 89 | Amorphous | 59 |
| 4 | Corn | GL | 1:1.5:4.5 | 10 | 104 | Amorphous | 60 |
| 5 | Wheat | GL | 1:5.7:13.3 | 60 | 89 | Amorphous | 29 |
| 6 | Wheat | PD | 1:5.7:13.3 | 60 | 89 | A | 2 |
| 7 | Wheat | BD | 1:5.7:13.3 | 60 | 89 | A | 2 |
| 8 | Wheat | PD | 1:1.5:4.5 | 10 | 113 | V | 87 |

[a]PHA = Polyhydric alcohol. GL = Glycerol; PD = 1,2-Propanediol; BD = 1,3-Butanediol
[b]Runs 1, 3, 5, 6, and 7 contained the same proportions of starch and liquids described by E. Montgomery and F. Senti, J. Polym. Sci. 28 (1958)1. The other runs were done using proportions devised in our laboratory.
[c]X-ray patterns were measured on products after solvent-exchange with ethanol.

III. Aqueous Butanediol Process

A. Preparation of GCWS Wheat Starch

Using the reaction setup described in Example IC, a 1:2:3 (w/w/w) mixture of wheat starch:water:1,3-butanediol was heated to an internal temperature of 104° C. in 10 minute reaction time. The fluidity of the reaction mixture was lost after 4 minutes of heating. After isolation in the normal fashion, the GCWS wheat starch was a free-flowing powder admixed with very little hard chunks that gave 79% cold water solubility, a V-type X-ray pattern, and contained mostly intact granular starch as shown by SEM and LM. Microscopy also revealed a network of cracks inside some granules, but many were damaged enough to give granules of irregular shape.

B. Preparation of GCWS Modified (Hydroxypropylated and Cross-Linked) Wheat Starch Into a 3-necked 2 L flask provided with a mechanical stirrer, thermometer and a reflux condenser was added a liquid mixture containing water (100.3 g) and 1,3-butanediol (315.7 g). To this mixture was added with stirring 50 g of modified wheat starch (45.1 g, dsb). The flask containing the above slurry was placed in a preheated oil bath (bath temperature 145°-155° C.) for 15 min. The reaction mixture appeared to have lost some fluidity as the product temperature reached 114° C. at the end of the heating period. Further product isolation was carried out as described in Example I-A for native wheat starch.

The amount of starch isolated (44.1 g, dsb) revealed 98% product recovery. The fine powdery product exhibited a cold water-solubility of 98%, and an amorphous X-ray pattern. Under SEM and LM the granules appeared intact, but were contorted with some material having been deposited on their surface.

C. Summary of GCWS Starch Prepared in Aqueous Butanediol (BD)

Table 4 shows GCWS wheat starches prepared using aqueous butanediols.

TABLE 4

Solubilities of GCWS Starches Prepared in the Aqueous Butanediol Process

| Run[a] | Butanediol | Starch | Ratio of Starch/ Water/ BD, w/w/w | Reaction Temperature, °C. | | Cold Water-Solubility, % |
|-----|------|--------|----------|---------|---------|---------|
| | | | | 5 min. | 10 min. | |
| NATIVE STARCHES | | | | | | |
| 1 | 1,3 | Wheat | 1:1.5:3.0 | 102 | 109 | 31 |
| 2 | 1,3 | Wheat | 1:2.0:3.0 | 102 | 104 | 79 |
| 3 | 1,4 | Tapioca | 1:1.5:4.5 | 108 | 111 | 13 |
| 4 | 2,3 | Tapioca | 1:1.5:4.5 | 108 | 110 | 11 |
| MODIFIED STARCHES[b] | | | | | | |
| 5 | 1,3 | Wheat HP | 1:1.0:3.0 | 105 | 115 | 62 |
| 6 | 1,3 | Wheat HP | 1:1.5:4.5 | 107 | 111 | 92 |
| 7 | 1,3 | Wheat HP | 1:2.3:7.0 | 100 | 112 | 98 |
| 8 | 1,4 | Wheat HP | 1:1.5:4.5 | 104 | 111 | 96 |
| 9 | 1,2 | Wheat HP | 1:1.5:4.5 | 100 | 107 | 92 |
| 10 | 1,3 | Wheat OS | 1:1.5:4.5 | 111 | 113 | 13 |

[a]All the experiments were done by heating 10 g of native or modified starch in a solvent mixture at an external temperature of 145-155° C. for 10 minutes. Mixtures were cooled to 100° C., at which time ethanol (200 mL) was added. The product was isolated as described in Example III-A.
[b]Commercially obtained starches. HP = hydroxypropylated and cross-linked. OS = octenylsuccinylated.

IV. General Discussion

Although the inventors do not wish to be bound to any particular theory which accounts for or explains the nature of the changes occurring in starch granules using the method of the invention, the following is offered by way of completeness and to explain the inventors' present beliefs and understandings.

When a slurry of starch in a prescribed mixture of water and polyhydric alcohol is heated at atmospheric pressure, the starch's native crystallites melt and the granules eventually undergo limited swelling and the mixture loses fluidity. Cooling, exchanging the liquids with ethanol, and drying produces GCWS starch.

Native starch granules are partially crystalline solids that are insoluble in cold water. That insolubility can be traced to the double-helix conformation of the starch's polymer chains. Double-helix starch chains are strongly ordered in crystal arrays that give the A-, B- and C-type x-ray diffraction patterns of native starches. On the other hand, the single-chain conformation of starch chains are soluble in cold water. The single-chain conformation gives either an amorphous x-ray pattern indicative of a random arrangement of polymer chains, or the V-type x-ray pattern, which is due to crystals of single-helical chains.

Most modified cook-up starches retain the A-, B- and C-type crystals that are present in native starches, since they are prepared under conditions that do not change the native crystals. Modified granular starches are generally insoluble in cold water.

Heating native starch in excess water converts the double-helix conformations into single chain conformations, thereby creating cold water-soluble starch. When starch is cooked in excess water, the granules swell and partially break apart as some starch is solubilized. The cooked paste can be dehydrated using alcohol, but large amounts of solvent are required. In many cases, the dry product is a mixture of starch molecules and dehydrated, fragmented granules.

When one part starch is heated in 10 parts or less of water, the paste will gel during cooling. Dehydration of a starch gel by solvent exchange with slow stirring (low shear) is a diffusion-controlled, slow, impractical process.

The work described here demonstrates the feasibility of producing GCWS starches by heating a slurry of starch in a mixture of water and polyhydric alcohol at atmospheric pressure. Two conditions must generally be met to achieve the transformation in a trouble-free manner.

The solvent system should advantageously contain a plasticizer to reduce the glass-transition temperature of the starch to below the boiling point of the solvent mixture. A sufficient reduction of the glass-transition temperature will then allow the crystals in the native starch granules to melt at a temperature ($T_m$) below the boiling point of the liquid. In the process described here, water serves as a powerful plasticizer of starch. The liquid simultaneously acts as the heat-transfer fluid to the individual granules. A second condition is that swelling of the granules in the hot reaction mixture must be restricted. It is well known that heating starch in excess water causes individual granules to lose their birefringence over a temperature range of 1°–2° C., whereas the entire population of granules shows melting over a range of 7°–10° C. If the granules with the lowest $T_M$ undergo rapid swelling, those granules become excessively rubbery and they fuse (collapse) together into a gel phase. The water captured in the gel particles now becomes unavailable to move to granules with a high $T_M$. Thus, the latter granules retain crystalline regions that do not melt. The gelled particles due to uneven swelling cannot be dehydrated using solvent exchange with mild agitation, so the hydrated gel retrogrades during air-drying. While the gel can be partially dehydrated using solvent exchange with very high shear, handling a gel would be difficult and energy costs would be high.

When a reaction mixture contains gel particles, the gel particles that do not disperse during solvent exchange are recognized in the air-dried product as coarse gritty material mixed with a fine powder. The gritty material may be intractable to water, and reduce cold water-solubility and swelling. If present, the gritty material would necessitate fine grinding of a GCWS starch.

X-ray analysis was used to examine many reaction mixtures upon cooling and before solvent exchange. All appeared amorphous, except native wheat starch, which gave a weak V-pattern in reactions using 1,2-propanediol or 1,3-butanediol. However, the dry GCWS starches made from amylose-containing starches, using 1,2- or 1,3-propanediol and 1,3-butanediol, gave strong V-type X-ray patterns, which was attributed to V-complex formation between amylose and ethanol during solvent exchange. Most modified amylose-containing starches, except hydroxypropylated ones, gave V-patterns as well. Amorphous patterns were found for GCWS starches from all native and modified waxy starches, as well as for hydroxypropylated amylose-containing starches. One exception was waxy barley starch, whose products showed a weak V-pattern.

The changes that are believed to occur in each step of the new process to make GCWS starches are outlined in Scheme I.

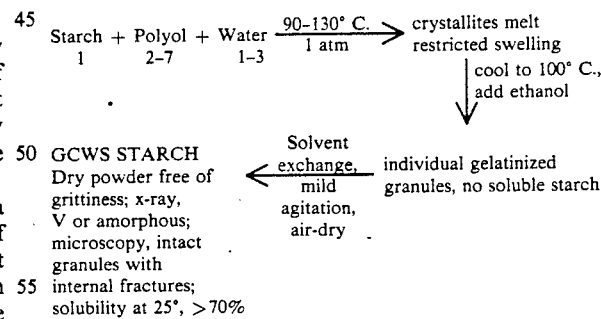

Scheme I.
Proposed Mechanism for Preparation of GCWS Starch

Depending on the starch, different but specific conditions are needed to produce GCWS products. The variables include (i) the proportions of starch, water and polyhydric alcohol, (ii) temperature, (iii) time and, (iv) isolation conditions. In some cases, such as waxy maize starch in aqueous propanediol or glycerol, and cereal starches with aqueous glycerol or ethylene glycol, the conditions may be very narrow and difficult to identify. Table 5 summarizes the most preferred reaction conditions for preparing GCWS starches with high cold water-solubilities.

TABLE 5

Examples of GCWS Starches of High Cold Water-Solubilities

| Run | Starch | PHA[a] | Starch:Water:PHA, (w/w/w) | Reaction Temp., °C. | Cold Water-Solubility, % |
|---|---|---|---|---|---|
| | | NATIVE | | | |
| 1 | Wheat | 1,2-PD | 1:1.5:4.5 | 113 | 87 |
| 2 | Corn | 1,2-PD | 1:1.5:4.5 | 127 | 85 |
| 3 | Tapioca | 1,2-PD | 1:1.5:4.5 | 111 | 92 |
| 4 | Potato | 1,2-PD | 1:3.0:3.0 | 104 | 94 |
| 5 | Tapioca | 1,3-PD | 1:1.5:4.5 | 114 | 100 |
| | | MODIFIED[b] | | | |
| 6 | Wheat-HP | 1,2-PD | 1:1.5:4.5 | 110 | 94 |
| 7 | Wheat-HP | 1,3-BD | 1:2.3:7.0 | 114 | 98 |
| 8 | Tapioca-HP | 1,2-PD | 1:1.5:4.5 | 112 | 89 |
| 9 | Wheat-OS | 1,2-PD | 1:1.5:4.5 | 114 | 93 |

[a]PHA = Polyhydric alcohol; PD = Propanediol; BD = Butanediol
[b]Commercially obtained modified starches; HP = hydroxypropylated and cross-linked, and OS = octenylsuccinylated.

V. Reaction Variables for the Process

An optimum ratio of starch and liquids should be used to convert a starch to its GCWS form. Table 6 illustrates the experiments that were used to derive the optimum ratio for wheat starch using aqueous 1,2-propanediol.

The liquid phase plays several roles in the reaction medium. The liquid phase serves as a heat-transfer medium to the individual granules in suspension. The liquid phase also supplies water to the starch granules. The water hydrates the starch molecules in the amorphous phase of the granules so that the melting point (gelatinization temperature) of the starch crystallites is reduced from above 150° C. at 13% MC to 90°-130° C. in the water-polyol mixture. When a slurry of starch in the polyol/water mixture is heated at an external temperature of 110° to 150° C., the slurry temperature rises until the starch crystallites undergo melting. After melting, the double helices may unwind, and the polymer molecules then adopt a single chain conformation. Alternatively, the double-helix conformation may not unwind, but remain in a non-crystalline state in the GCWS starch due to lack of mobility. Adding water to the GCWS starch would unwind the double helices, and produce a hydrated starch paste.

The temperature required for melting of the double helix crystals in a given starch depends on the polyol used. For example, glycerol compared to propanediol appears to be a better plasticizer for the starch chains in the amorphous phase, which in turn reduces the melting point of the crystals. Table 2, Run No. 3, shows that heating one part of potato starch in water/glycerol (1.5/4.5; w/w) to 115° C. gave 81% cold water-solubility, while the same starch in water/1,2-propanediol (1.5/4.5; w/w) heated to 115.° C. gave but 2% solubility (Table 1, Run No. 4). Other starches heated in water/propanediol to 111°-113° C., such as wheat and tapioca, gave 87-92% water solubility (Table 1, Run Nos. 1 and 5.

It appears that the total amount of water and 1,2-propanediol used relative to starch, as well as the relative ratio of water and 1,2-propanediol in the solvent mixture, may play an important role in this process.

For example, too little solvent phase in the reaction mixture gives limited hydration of the amorphous phase of the starch granules and poor heat transfer. Those deficiencies reduce the proportion of gelatinized granules, especially with a high proportion of polyhydric alcohol to water, and thereby prevent the desired change in solubility (Run Nos. 1 & 2, Table 6). On the other hand, reaction mixtures containing extremely large amounts of solvents do not reach a high enough temperature in the 10 min heating period to effect melting of starch crystallites. (Run No. 14, Table 6). Furthermore, high moisture content in the mixture leads to excess swelling of the gelatinized granules, which causes them to fuse together into a gel phase (Run Nos. 8 & 11). When the products of Run Nos. 8 and 11 were solvent-exchanged, the air-dried product was gritty and SEM showed highly distorted and fragmented granules together with small pieces.

High solubilities were found in Run Nos. 4, 7 and 9 (Table 6). Run No. 7 is the most preferable by virtue of the ease of handling of the reaction mixture and the high solubility of the product. Because of the economic constraint of reducing the level of polyhydric alcohol to a minimum, an optimum amount of solvent must be determined in this low-pressure process.

TABLE 6

Effect of Starch Slurry Composition on the Cold Water-Solubility of Native Wheat Starch Prepared in Aqueous 1,2-Propanediol (PD)

| Run | Solvents[a] Water grams | Solvents[a] PD grams | Ratio of Starch: Water: PD, w/w/w | Water as Percent of Water Plus Starch | PD as Percent of PD Plus Starch | Water as Percent of Water Plus PD | Internal Reaction Temp. After 10 min, °C. | Cold Water-Solubility, % |
|---|---|---|---|---|---|---|---|---|
| 1 | 5.05 | 24.08 | 1:0.67:2.7 | 40 | 73 | 20 | 120 | 52 |
| 2 | 5.05 | 18.06 | 1:0.67:2.0 | 40 | 67 | 25 | 117 | 69 |
| 3 | 8.06 | 36.12 | 1:1.0:4.0 | 50 | 80 | 20 | 116 | 77 |
| 4 | 8.06 | 27.09 | 1:1.0:3.0 | 50 | 75 | 25 | 116 | 90 |
| 5 | 8.06 | 21.07 | 1:1.0:2.3 | 50 | 70 | 30 | 110 | 64 |
| 6 | 12.60 | 54.28 | 1:1.5:6.0 | 60 | 86 | 20 | 120 | 84 |
| 7 | 12.60 | 40.71 | 1:1.5:4.5 | 60 | 82 | 25 | 113 | 87 |
| 8 | 12.60 | 31.66 | 1:1.5:3.5 | 60 | 78 | 30 | 111 | part gel[b] |
| 9 | 20.10 | 84.28 | 1:2.3:9.3 | 70 | 90 | 20 | 118 | 87 |
| 10 | 20.10 | 63.21 | 1:2.3:7.0 | 70 | 88 | 25 | 115 | 82 |
| 11 | 20.10 | 49.16 | 1:2.3:5.4 | 70 | 85 | 30 | 105 | part gel[b] |
| 12 | 35.15 | 144.48 | 1:4.0:16 | 80 | 94 | 20 | 117 | 82 |
| 13 | 35.15 | 108.36 | 1:4.0:12 | 80 | 92 | 25 | nd[c] | nd[c] |
| 14 | 81.27 | 328.96 | 1:9.1:36.4 | 90 | 97 | 20 | 105 | 26 |

TABLE 6-continued

Effect of Starch Slurry Composition on the Cold Water-Solubility of Native Wheat Starch Prepared in Aqueous 1,2-Propanediol (PD)

| Run | Solvents[a] Water grams | PD | Ratio of Starch: Water: PD, w/w/w | Water as Percent of Water Plus Starch | PD as Percent of PD Plus Starch | Water as Percent of Water Plus PD | Internal Reaction Temp. After 10 min, °C. | Cold Water-Solubility, % |
|---|---|---|---|---|---|---|---|---|
| 15 | 81.27 | 246.72 | 1:9.1:27.3 | 90 | 97 | 25 | nd[c] | nd[c] |

[a]All the experiments were done by heating 10 g of native wheat starch (MC 9.7%) in a solvent mixture at an external temperature of 145-155° for 10 minutes. Mixtures were cooled to 100° C., at which time ethanol (200 mL) was added. The product was isolated as described in Example I-A.
[b]After reaction and initial addition of ethanol this product contained gelled material admixed with the wet powder as observed visually. Further solvent exchange in ethanol followed by drying gave a fine powder admixed with some small hard particles estimated to be less than 20% by dry weight.
[c]nd = Not determined.

To effect cold water-solubility by the new process a minimum temperature must be exceeded in each reaction. This temperature depends on the type of starch, the choice of polyhydric alcohol, and the proportions of the three reactants. Table 7 shows, for example, that a product temperature of at least 113° C. must be reached when one part of wheat starch is heated in a 1.5/4.5(w/w) mixture of water/1,2-propanediol. To achieve a temperature of 113° C. required at least 10 min heating period in a glass flask being heated in an oil bath at 145°-155° C. (Table 8).

TABLE 7

Cold Water-Solubilities of Native Wheat Starch Samples After Heating to Different Temperatures in Aqueous 1,2-Propanediol

| Run[a] | Heating Bath Temperature, °C. | Product Temperature, °C. 5 minutes | 10 minutes | Cold-Water-Solubility, % |
|---|---|---|---|---|
| 1 | 135-145 | 100 | 108 | 71 |
| 2 | 145-155 | 105 | 113 | 87 |
| 3 | 155-165 | 110 | 116 | 82 |
| 4 | 165-175 | 117 | 124 | 82 |

[a]All reactions were carried out with 10 g of native wheat starch (starch:water:1,2-PD = 1:1.5:4.5, w/w/w) for 10 minutes. Ethanol (200 mL) was added after cooling to 100° C., and product isolation was carried out as described earlier.

TABLE 8

Cold Water Solubilities of Native Wheat Starch Samples After Heating for Different Time Periods in Aqueous 1,2-Propanediol

| Run[a] | Reaction Time, Minutes | Final Product Temperature, °C. | Cold Water-Solubility, % |
|---|---|---|---|
| 1 | 3 | 100 | 42 |
| 2 | 10 | 113 | 87 |
| 3 | 30 | 118 | 87 |

[a]All reactions were carried out with 10 g of native wheat starch (starch:water:1,2-PD = 1:1.5:4.5, w/w/w) heated externally at 145-155° C.

VI. Isolation Variables

Generally, after the transformation temperature has been exceeded in a reaction mixture, ethanol should be added as soon as possible to prevent some loss of water-solubility. The method of adding the first portion of ethanol has some effect on the solubility of the final product. Subsequent additions of ethanol and solvent exchange showed no adverse effects. Tables 9 and 10 illustrate these general principles using the aqueous propanediol process on wheat starch.

The temperature of addition of ethanol to the heated reaction mixture appears to have some effect on the cold water-solubility of isolated starch, especially if the addition is delayed (see Run Nos. 2 and 5, Table 9). Run No. 3 is deemed to be the optimum isolation condition. The amount of ethanol added immediately after cooling (100° C.) the reaction also affects cold water-solubility. Ten to twenty volumes of ethanol to starch weight gave optimum solubility (Table 10). Further solvent exchange with ethanol (3×5-volumes) followed by removal of ethanol gave a fine powdery product, which is free of propanediol (Table 10).

TABLE 9

Cold Water Solubilities of GCWS Wheat Starch Prepared in Aqueous 1,2-Propanediol under Various Isolation Conditions

| Run | Isolation Condition[a] | Cold Water-Solubility, % |
|---|---|---|
| 1 | immediate addition of ethanol | 82 |
| 2 | delayed addition of ethanol[b] | 80 |
| 3 | cool to 100° C.; then add ethanol | 87 |
| 4 | cool to 50° C.; then add ethanol | 84 |
| 5 | cool to 0° C.; then add ethanol | 79 |

[a]All reactions were carried out with 10 g of native wheat starch (starch:water:1,2-PD = 1:1.5:4.5, w/w/w) heated externally at 145-155° C. for 10 minutes, and ethanol (220 mL) was then added using the different protocols. Isolation was completed as described in Example I-A, except solvent amounts were reduced by one-fifth.
[b]Ethanol was added during suction filtration of the reaction mixture in the Buchner funnel.

TABLE 10

Effect of Varying Amounts of Ethanol on the Cold Water Solubility of the Starch Product

| Run[a] | Amount of Ethanol Added[b], mL | Cold Water-Solubility, % | 1,2-Propanediol in Final Product[c], % |
|---|---|---|---|
| 1 | 50 | 81 | 0 |
| 2 | 100 | 83 | 0 |
| 3 | 150 | 83 | 0 |
| 4 | 200 | 87 | 0 |

[a]All experiments were carried out with 10 g of native wheat starch (starch:water:1,2-PD = 1:1.5:4.5, w/w/w) heated externally at 145-155° C. for 10 minutes.
[b]Amount of ethanol added after cooling the reaction mixture to approximately 100° C.
[c]Amount of 1,2-Propanediol was determined by the procedure of D. P. Johnson, Anal. Chem. 41 (1969) 859.

VII. Properties of GCWS Starches

A. Pasting

To measure paste consistencies, cook-up starches were slurried in water and subjected to a cooking cycle followed by cooling to 25° C., whereas GCWS starches in accordance with the invention were pasted directly in cold water at 25° C. Table 11 shows that the final paste consistencies of the GCWS starches matched those of the cook-up starches, except GCWS wheat starch. The lower consistency seen with CWS native wheat starch as compared to the corresponding base starch (Run No. 2 vs 1) may be attributed to its somewhat low CWS (82%) and incomplete swelling. When a dry blend of GCWS wheat starch and sucrose (starch:sucrose=1:3, w/w) was pasted in water using a heating cycle of 25° C. to 95° C. at 1.5° C./min, held at 95° C. for 10 minutes, then cooled to 25° C., the consistency of the resultant cold paste was greater than that of native wheat starch subjected to the same conditions (data not in Table 11). It is therefore concluded that heating various starches in aqueous polyhydric alcohols does not damage the thickening power of the starches.

somewhat below that of the commercial sample (Table 12).

TABLE 12

| | | | Estimated | Gel Strength[b], grams force | | | | | |
|---|---|---|---|---|---|---|---|---|---|
| | | Cold Water-Solubility, | Gelling | | | | | | |
| Run | Starch[a] | % | Time, min. | 2h | 4h | 8h | 24h | 31h | 48h |
| 1 | Commercial GCWS Corn | 95 | 20 | 118 | 152 | 110 | 168 | — | — |
| 2 | GCWS Corn | 82 | 35 | 76 | 110 | 144 | 137 | — | — |
| 3 | GCWS Wheat | 82 | >60 | 39 | 77 | 83 | 111 | 107 | 111 |

[a]Formula used for gel preparation on a weight basis; starch 7.1%; citric acid 0.1%; fructose 0.7%; 55% high-fructose corn syrup 21.1%; water 71%.
[b]Gel strength was measured using a Voland-Stevens Texture Analyzer after storage at 25° C.

C. X-Ray Diffraction of Starches

GCWS starches prepared starting with native, amylose-containing starches gave V-type x-ray patterns, while those from modified starches gave V- or amorphous patterns (Table 13).

TABLE 13

| | X-Ray Diffraction Patterns of Various Starches | | |
|---|---|---|---|
| Run | Starch | Polyhydric Alcohol Used | X-Ray Pattern[a] |
| 1 | Native Wheat | — | A |
| 2 | GCWS Native Wheat | 1,2-Propanediol | V |
| 3 | Native Corn | — | A |
| 4 | GCWS Native Corn | 1,2-Propanediol | V |
| 5 | Native Tapioca | — | C |
| 6 | GCWS Tapioca | 1,2-Propanediol | V |
| 7 | Native Potato | — | B |
| 8 | GCWS Native Potato | 1,2-Propanediol | V |
| 9 | GCWS Native Potato | Glycerol | V |
| 10 | Wheat[b] HP | — | A |
| 11 | GCWS Wheat HP | 1,2,-Propanediol | Amorphous |
| 12 | GCWS Wheat HP | 1,3-Butanediol | Amorphous |
| 13 | Tapioca[b] HP | — | C |
| 14 | GCWS Tapioca HP | 1,2-Propanediol | Amorphous |

[a]X-ray diffraction patterns of starch were taken with Cu, Ni foil filtered K-alpha radiation. Operation was at 34kV and 20mA. Polymorph assignments based on reflections reported by H. F. Zobel in Methods in Carbohydrate Chemistry, Vol IV, 1964, pp 109-113.
[b]Commercially obtained starch - HP = hydroxypropylated and cross-linked.

TABLE 11

| | | | Starch Solids | | |
|---|---|---|---|---|---|
| Run[a] | Starch | PHA Used[b] | Concentration, % | Pasting Conditions[c] | Consistency B.U. at 25° C. |
| 1 | Native Wheat | — | 7.0 | heat | 400 |
| 2 | GCWS Wheat | PD | 7.0 | no heat | 190 |
| 3 | Native Tapioca | — | 7.5 | heat | 265 |
| 4 | GCWS Tapioca | PD | 7.5 | no heat | 275 |
| 5 | Tapioca HP | — | 6.0 | heat | 550 |
| 6 | GCWS Tapioca HP | PD | 6.0 | no heat | 590 |
| 7 | Wheat HP | — | 6.0 | heat | 500 |
| 8 | GCWS Wheat HP | PD | 6.0 | no heat | 470 |
| 9 | GCWS Wheat HP | BD | 6.0 | no heat | 475 |

[a]Runs 5-9 were done using commercially produced HP starches. HP = hydroxypropylated and cross-linked.
[b]PD = 1,2-Propanediol; BD = 1,3-Butanediol.
[c]Pasting conditions for cook-up starches were heating from 25° C.-95° C. at 1.5° C./min., holding at 95° C. for 10 minutes, cooling from 95° C.-25° C. and finally holding at 25° C. for 30 minutes. GCWS starches were stirred in the amylograph for 90 minutes at 25° C.

B. Gelling

Smooth pastes of GCWS corn and wheat starches were prepared as follows. Starch (40 g), fructose (4 g), and citric acid (0.8 g) were blended together, and the mixture dispersed uniformly in high fructose corn syrup (77% solids, 120 g). Cold water (5° C.,400 g) was added to the above mixture with rapid stirring using a wire whip, and the paste poured into shallow dishes. After standing at 25° C. for various periods of time, gel strength was measured using a Voland Stevens Texture Analyzer fitted with a cylindrical plunger. The force to compress a gel to 4 mm without fracture was recorded.

The pastes prepared from the GCWS starches were free of lumps, and they set to gels with a smooth surface and high sheen. In comparison to a commercial sample of GCWS corn starch, the GCWS corn starch of the invention gave a thicker mixture in the high fructose corn syrup, but a less viscous mixture after adding water. Furthermore, the new GCWS corn starch formed a gel somewhat more slowly, and its gel strength was

We claim:
1. A process for preparing granular cold water-soluble starch comprising the steps of:
   preparing a slurry of initially cold water insoluble starch granules and a liquid phase including water and a polyhydric alcohol, said slurry having a starch:water weight ratio of from about 1:0.6 to 1:3, and a starch:polyhydric alcohol weight ratio of from about 1:2 to 1:10, both of the foregoing ratios being on a dry starch basis;

heating said slurry to a temperature of from about 80°–130° C. for a period of from about 3–30 minutes to convert the crystalline structure of said starch granules to cold water-soluble V-type single helix crystalline structure or an amorphous structurel while substantially maintaining the granular integrity of the starch and yielding birefringent starch granules having a cold water solubility of at least about 70%; and separating the birefringent, converted, cold water-soluble starch granules or fragments thereof from said liquid phase.

2. The process of claim 1, said starch being selected from the group consisting of cereal, tuber, root and legume starches.

3. The process of claim 2, said starch being selected from the group consisting of native wheat, corn, potato, sweet potato, tapioca, mung bean, waxy barley, and waxy corn starches, and cross-linked and substituted wheat, corn, waxy corn, potato and tapioca starches, and cross-linked waxy corn starch.

4. The process of claim 1 said polyhydric alcohol being selected from the group consisting of, 1,2- and 1,3-propanediols, all positional isomers of butanediol and glycerol.

5. The process of claim 1, said starch:water ratio being from about 1,0:1.0 to 3 and said starch:polyhydric alcohol ratio being from about 1.0:2 to 7.

6. The process of claim 1, said temperature being from about 85° to 127°.

7. The process of claim 1, said time being from about 10 to 15 minutes.

8. The process of claim 1, said heating step being carried out at substantially atmospheric pressure.

9. The process of claim 1, said separating step comprising the steps of adding an excess of volatile solvent to said slurry which is miscible with water and polyhydric alcohol, and volatilizing said solvent.

10. The process of claim 9, said solvent being selected from the group consisting of edible alcohols.

11. The process of claim 10, said solvent being selected from the group consisting of ethanol, methanol, and iso-propanol.

12. The process of claim 1, said converted, cold water-soluble starch granules having a cold water-solubility of at least about 80%.

* * * * *